United States Patent [19]

Stevens et al.

[11] Patent Number: 5,151,475
[45] Date of Patent: Sep. 29, 1992

[54] TERMINATION OF ANIONIC POLYMERIZATION

[75] Inventors: Craig A. Stevens; Carma J. Gibler, both of Houston; Linda R. Chamberlain, Richmond; Thomas F. Brownscombe, Houston, all of Tex.

[73] Assignee: Shell Oil Company, Houston, Tex.

[21] Appl. No.: 685,111

[22] Filed: Apr. 15, 1991

[51] Int. Cl.⁵ .................................................. C08F 2/38
[52] U.S. Cl. ........................................ 526/83; 526/82; 526/173; 526/335; 526/340; 526/340.2; 526/284
[58] Field of Search ............... 526/82, 83, 84, 346, 526/340, 340.2, 284

[56] References Cited

U.S. PATENT DOCUMENTS

| | | | |
|---|---|---|---|
| 2,449,949 | 9/1944 | Morris et al. | 260/74 |
| 3,303,225 | 2/1967 | Hsieh et al. | 526/173 X |
| 3,472,829 | 10/1969 | Claybaugh et al. | 260/93.7 |
| 3,475,399 | 10/1969 | Peters et al. | 260/93.7 |
| 3,520,858 | 7/1970 | Bodnar et al. | 260/83.7 |
| 3,525,729 | 8/1970 | Gaeth | 260/94.3 |
| 3,541,064 | 11/1970 | Yoshimoto et al. | 260/85.1 |
| 3,580,897 | 5/1971 | Yoshimoto et al. | 260/85.1 |
| 3,594,357 | 7/1971 | Logothetis | 526/64 X |
| 3,644,567 | 2/1972 | Smith et al. | 260/829 |
| 3,720,654 | 3/1973 | Olechowski | 260/85.3 R |
| 3,763,126 | 10/1973 | Farrar | 526/82 |
| 3,845,030 | 10/1974 | Uraneck et al. | 526/83 X |
| 3,937,759 | 2/1976 | Baumgartner et al. | 260/879 |
| 3,957,914 | 5/1976 | Baumgartner | 260/880 B |
| 4,014,859 | 3/1977 | Cooper et al. | 526/65 |
| 4,134,938 | 1/1979 | Langer, Jr. | 525/250 |
| 4,156,673 | 5/1979 | Eckert | 260/33.6 AQ |
| 4,284,741 | 8/1981 | Uraneck et al. | 525/297 |
| 4,340,703 | 7/1982 | Freppel | 526/79 |
| 4,501,857 | 2/1985 | Kishimoto et al. | 525/338 |
| 4,547,555 | 10/1985 | Cook et al. | 526/60 |
| 4,629,767 | 12/1986 | Shyr et al. | 525/339 |

FOREIGN PATENT DOCUMENTS

| | | |
|---|---|---|
| 3342766 | 11/1982 | Fed. Rep. of Germany . |
| 363810 | 12/1931 | United Kingdom . |
| 1243702 | 6/1969 | United Kingdom . |
| 1539905 | 7/1976 | United Kingdom . |
| 2118952 | 11/1983 | United Kingdom ............ 526/82 |

OTHER PUBLICATIONS

Ziegler-Natta Catalysts and Polymerizations, John Boor, Jr., published by Academic Press in 1979.
U.S. Ser. No. 522,693 to Kibler et al., filed May 14, 1990.

Primary Examiner—Fred Teskin
Attorney, Agent, or Firm—Donald F. Haas

[57] ABSTRACT

This is an improvement upon a process which comprises anionically polymerizing monomers with an anionic polymerization initiator in a suitable solvent thereby creating a living polymer. The improvement comprises terminating the polymerization by the addition of a terminating agent selected from the group consisting of boranes, ammonia, halogens, hydrocarbons containing a C-H group where the carbon is connected directly to a triply-bound carbon or to two doubly-bound carbons and silanes.

20 Claims, No Drawings

TERMINATION OF ANIONIC POLYMERIZATION

BACKGROUND OF THE INVENTION

This invention relates to an improvement in the long used method of making block copolymers from conjugated diolefins and/or alkenyl aromatic hydrocarbons. The improvement comprises utilizing boranes, ammonia, halogens, silanes, or certain unsaturated hydrocarbons to terminate the anionic polymerization. We previously filed "Termination of Anionic Polymerization Using Hydrogen", Ser. No. 522,693, filed May 14, 1990.

Anionic polymerization utilizing organo alkali metal initiators has long been used to polymerize conjugated diolefins such as butadiene and isoprene and to copolymerize such diolefins with styrene and substituted styrenes to make styrene—butadiene—styrene (S—B—S) and styrene—isoprene—styrene (S—I—S) block copolymers and similar block copolymers. The reaction of these latter block copolymers is used below for exemplary purposes. This reaction is usually carried out in an inert hydrocarbon solvent such as cyclohexane or toluene and it is necessary to rigorously exclude oxygen, water or any impurity that can react with the highly reactive propagating species. Under these conditions the polymeric molecular weights can be precisely controlled. The preferred initiators are organolithiums, although others can be used. Two commonly used methods are:

1. Sequential. i.e., start polymerization at one end of the molecule and continue to the other.
2. Coupling. i.e., start polymerization at each end of the molecule and then join the reactive chains together by a coupling or a linking agent.

In these polymerization methods, sec-butyl lithium is the preferred initiator because it initiates the polymerization very readily. That is to say, the rate of the initiation reaction is high compared to that of the subsequent polymerization. This initiator first reacts with one molecule of styrene monomer. This is known as the initiation reaction.

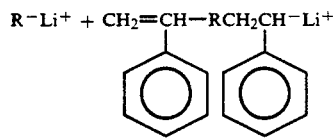
(1)

The product can then continue polymerization of the styrene and this is known as the propagation reaction.

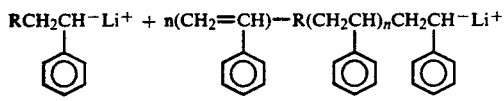
(2)

The new end product is termed polystyryl lithium (the effects of the terminal sec-butyl radical are ignored) and it is denoted as $S^-Li^+$. If a diene (in this case butadiene) is added, the $S^-Li^+$ can initiate further polymerization:

$$S^-Li^+ + n(CH_2{=}CHCH{=}CH_2){-}S(CH_2CH{=}CHCH_2)_{n-1}CH_2CH{=}CHCH_2{-}Li^+$$ (3)

For the above reaction the product is denoted $S{-}B^-Li^+$. It also is an initiator, so that if more styrene monomer is now added, it will polymerize onto the "living" end of the polymer chain:

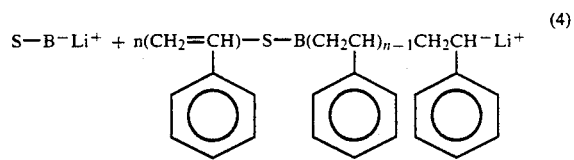
(4)

When this last reaction is complete, the product (S—B—S$^-$Li$^+$-polystyryl lithium) can be inactivated by the addition of a protonating species such as an alcohol. This terminates the reaction:

$$S{-}B{-}S^-Li^+ + ROH {-} S{-}B{-}SH + ROLi$$ (5)

If the polymer is to be made by coupling, the first three reactions shown above are unchanged, but instead of the $S{-}B^-Li^+$ initiating further polymerization of styrene, in this case it is reacted with a coupling agent:

$$2S{-}B^-Li^+ + X{-}R{-}X{-}S{-}B{-}R{-}B{-}S + 2LiX$$ (6)

Many coupling agents have been described, including esters, organohalogens and silicon halides. The example above shows the reaction of difunctional coupling agents but those of higher functionality (for example SiCl$_4$) can also be used and give branched or star-shaped molecules $(S{-}B)_n x$. There are cases whereby the coupling agent is not incorporated in the polymer. If divinyl benzene is added at the end of the reaction the products are highly branched, i.e., the value of n is very large. This reaction can also be terminated with an alcohol. It is necessary to terminate the living polymer to prevent crosslinking and unwanted coupling reactions, and hence formation of high molecular weight polymer which results in unsatisfactory physical properties and performance.

The use of alcohol results in formation of alkali metal alkoxides and excess alcohol impurities. The excess alcohol and alkali metal alkoxides adversely affect the activity of some hydrogenation catalysts in the downstream hydrogenation step should hydrogenation of the polymer be desired. Additionally, residual alcohol in the polymerization reactor deactivates part of the living polymer in the next batch which can lead to poor molecular weight control through the formation of intermediate molecular weight material and/or polystyrene homopolymer. Also, in using methanol as a polymerization termination agent it is required that the majority of methanol be removed from recycled solvents creating waste effluent which must be disposed of. Thus, there is a need for a method of terminating the polymerization of these living polymers which would not result in the formation of alkali metal alkoxides and excess alcohol in the system. The termination step of the present invention is clean and efficient, and produces a cement free of deleterious impurities.

SUMMARY OF THE INVENTION

The present invention provides a solution to the problems of polymerization termination using alcohols. The invention is an improvement upon the process for making polymers of any anionically polymerizable monomer, especially conjugated diolefins and particularly copolymers of conjugated diolefins and alkenyl aromatic hydrocarbons, which comprises anionically polymerizing the monomers with an organo alkali metal polymerization initiator in a suitable solvent thereby creating a living polymer. The improvement comprises terminating the polymerization by the addition of a termination agent selected from the group consisting of boranes, ammonia, halogens including chlorine, hydrocarbons containing a C—H group where the carbon is connected directly to a triply-bound carbon or to two doubly-bound carbons and silanes which react with the living polymer to end the polymer chain. It is preferred that the alkali metal initiator be an organo lithium compound and, in most cases, the preferred organo lithium compound is sec-butyl lithium.

DETAILED DESCRIPTION OF THE INVENTION

Any anionically polymerizable monomer which forms an anion strong enough to react with these terminating agents should be effective in this invention. Particular monomers which can be used include acrylamides, acrylonitriles, nitrobutene, vinylisocyanate, anhydrides, methacrylates, including methyl methacrylate, alkyl and aryl acrylates, vinyl pyridines, carbodiimides, lactams, dienes and styrene and styrene derivatives including alkylstyrenes, halogenated methoxy styrenes and nitrostyrene, as well as 1,3 pentadiene and 1,3-octadiene.

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block, star, radial or a combination of these. When the double bonds in the polyolefin are separated by three or more carbon atoms, the ethylenic unsaturation incorporated into the polymer will be contained in a branch extending outwardly from the main polymer chain but when the polyolefin is conjugated at least a portion of the ethylenic unsaturation incorporated into the polymer may be contained in the polymer backbone.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, anionically polymerizable monomers including conjugated diolefin polymers and copolymers of conjugated diolefins and alkenyl aromatic hydrocarbons are prepared by contacting the monomer or monomers to be polymerized simultaneously or sequentially with an anionic polymerization initiator. Such initiators include Group IA metals, their alkyls, amides, silanolates, napthalides, biphenyls and anthracenyl derivatives. It is preferred to use an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

wherein: R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, diethyl ether, tetrahydrofuran and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be treated in accordance with this invention also include block copolymers such as those described in U.S. Pat. Nos. 3,231,635; 3,265,765 and 3,322,856, the disclosure of which patents are also incorporated herein by reference. In general, linear and branched block copolymers which may be treated in accordance with the present invention include those which may be represented by the general formula:

$$A_z-(B-A)_y-B_x$$

wherein:
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 or 1;
y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x-(A-B)_y-A_z]_n-C-P_{n'}$$

wherein:
A, B, x, y and z are as previously defined; n and n' are, independently, numbers from 1 to about 100 such that $n+n' \geq 3$;
C is the core of the coupled or radial polymer formed with a polyfunctional coupling agent; and
each P is the same or a different polymer block or polymer segment having the general formula:

$$B'_{x'}-(A'-B'')_{y'}-A''_{z'}$$

wherein:
A" is a polymer block containing predominantly monoalkenyl aromatic hydrocarbon monomer units;
B' is a polymer block containing predominantly conjugated diolefin monomer units;
A'—B" is a polymer block containing monoalkenyl aromatic hydrocarbon monomer units (A') and conjugated diolefin monomer units (B"), the A'—B" monomer units may be random, tapered or block and when A'—B" is block, the A' block may be the same or different from A" and B" may be the same or different from B';
x' and z' are, independently, numbers equal to 0 or 1; and
y' is a number from 0 to about 15, with the proviso that the sum of $x'+y'+z \geq 1$.

The radial polymers may, then, be symmetric or asymmetric.

In the production of all of the polymers described above, the polymerization may be terminated by utilizing the described terminating agents in place of the conventionally used alcohol terminating agent. The living polymer, or more accurately, the living end of the polymer chain, is terminated by the addition of the terminating agent thereto. This termination reaction takes place instead of reaction number (5) shown above.

Lithium chloride, lithium boride, lithium hydride, lithium amide, lithium cyclopentadienide, etc. may be formed during the termination process. They are not expected to be reactive polymerization initiators. They are somewhat inert toward anionic polymerization and will not interfere with the molecular weight control of the next polymerization batch as alcohol can.

As stated above, the terminating agents which may be used to terminate the anionic polymerization according the present invention are boranes, ammonia, halogens, hydrocarbons containing a C—H group where the carbon is connected directly to a triply-bound carbon or to two doubly-bound carbons and silanes. Examples of suitable hydrocarbons include cyclopentadiene (which is preferred), diphenylmethane, triphenylmethane, acetylene, methylacetylene, 1,4-pentadiene and 3-vinyl-1,4-pentadiene. This invention relates to the use of hydrocarbons which are sufficiently activated to allow them to quench the living anions involved in anionic polymerization. The preferred halogen is chlorine.

The termination reaction may be performed using several techniques. After the polymerization of the living polymer is complete, the living polymer is contacted with the terminating agent to provide terminated polymer. The contact of the living polymer and the terminating agent is typically performed in a well-mixed reactor, where the living polymer is dissolved in a suitable solvent. The terminating agents may be gases, liquids or solids. Addition of a gaseous terminating agent to a reactor holding a living-polymer solution may be facilitated by bubbling the gas through the solution or by adding a solution of gas dissolved in an appropriate solvent. A liquid terminating agent may be added to the living-polymer solution by adding the liquid directly to the reactor or by adding a solution of liquid diluted in an appropriate solvent. The addition of solid terminating agents to the living-polymer solution may be performed by adding the solid into the reactor, by adding a solid/solvent slurry or by adding a solution of the solid dissolved in an appropriate solvent.

When this improvement is used, the problems of using alcohol, i.e. the formation of lithium alkoxides and excess alcohol impurities, are avoided. However, the advantages of polymer termination by the alcohol method are obtained. The use of some of these terminating agents may cause coupling of the polymer because of the chemical functionality of the terminating agents. These terminating agents may cause monodisperse coupling, i.e. increase of molecular weight two, three or four times. For instance, borane, ammonia and cyclopentadiene may cause coupling. Theoretically, the coupling problems can be avoided altogether if a large excess of terminating agent is used.

Criteria for Termination of Living Polymer

Several methods may be employed to verify the termination of living polymer. One method is based on the color of the living polystyryl lithium, typically a deep orange color. When the living polystyryl lithium is terminated with methanol, for example, the color is extinguished. A second method is based on the addition of styrene monomer to the living polymer chain. If the living polymer anion is sufficiently active to promote styrene polymerization, the addition of styrene monomer will provide a deep orange color of living polystyryl lithium. A third method of verifying the termination of living polymer is based on gel permeation chromatography. If the polymer has not been fully terminated, the results from the gel permeation chromatography show a large amount of high-molecular-weight polymer with a broad molecular weight distribution. The absence of high-molecular-weight polymer indicates that the polymer was fully terminated. However, with some of these terminating agents, there may be formation of coupled polymer.

EXAMPLE 1

S—B—S Polymer Terminated With Borane

A styrene—butadiene—styrene (S—B—S—Li$^+$) block copolymer of 45,000 molecular weight was made by anionic polymerization using sec-butyl lithium as the initiator. The polymerization was performed in a mixture of cyclohexane and diethyl ether in a two-gallon autoclave. The resulting polymer solution contained 20 percent polymer by weight.

A solution of 1.0M borane in tetrahydrofuran was added to the reactor. The amount of borane solution added to the reactor provided 25 percent excess terminating agent on a molar basis versus the "living" polymer ends. The expected reaction is shown in Equation 7:

$$S-B-S^-Li^+ + BH_3 \rightarrow S-B-S-H + LiBH_2 \quad (7)$$

The reactor temperature was held constant at 20° C. and the pressure held constant at approximately 60 psig.

A sample of the contents of the reactor was taken 15 minutes after adding the borane solution. The color of the polymer cement was water white, indicating that the living polystyryl lithium (S—B—S⁻Li⁺) was terminated. In addition, gel permeation chromatography was performed on samples taken before and after the addition of the borane solution. The results of the gel permeation chromatography show that 38 percent of the polymer mass was coupled to form both two and three-arm species. No high molecular weight polymer (HMP) was formed.

EXAMPLE 2

S—B—S Polymer Terminated With Ammonia

A styrene—butadiene—styrene (S—B—S⁻Li⁺) block copolymer of 45,000 molecular weight was made by anionic polymerization using sec-butyl lithium as the initiator. The polymerization was performed in a mixture of cyclohexane and diethyl ether. The resulting polymer solution contained 20 percent polymer by weight.

Ammonia gas was sparged continuously, through a sparge ring, into the reactor at a pressure of approximately 10 psig. Excess gas was vented from the top of the reactor.

The expected reaction is shown in Equation 8:

$$S-B-S^-Li^+ + NH_3 \rightarrow S-B-S-H + LiNH_2 \quad (8)$$

The reactor temperature was held constant at 30° C. while sparging ammonia gas into the stirred polymer cement. Samples were taken at fifteen minute intervals to monitor the progress of the termination. At time zero (before addition of ammonia), the cement was deep orange—indicating the presence of living polystyryl lithium (S—B—S⁻Li⁺). After fifteen minutes, the cement lost some of its color. After thirty minutes of sparging, the cement was clear yellow and did not initiate styrene monomer. The results of the gel permeation chromatography show that 12 percent of the polymer mass was coupled to form both two and three-arm species. No HMP was formed.

EXAMPLE 3

S—B—S Polymer Terminated With Chlorine

A styrene—butadiene—styrene (S—B—S⁻Li⁺) block copolymer of 40,000 molecular weight was made by anionic polymerization using sec-butyl lithium as the initiator. The polymerization was performed in a mixture of cyclohexane and diethyl ether in a two-gallon autoclave. The resulting polymer solution contained 20 percent polymer by weight.

Chlorine gas was sparged into the reactor through a sparge ring. The amount of chlorine added to the reactor was approximately 70 times that required stoichiometrically (most of the chlorine occupied the gas cap). The expected reaction is shown in Equation 9:

$$S-B-S^-Li^+ + Cl_2 \rightarrow S-B-S-Cl + LiCl \quad (9)$$

The reactor temperature was held constant at 28° C. and the pressure held constant at approximately 40 psig after sparging the gas into the reactor.

A sample of the contents of the reactor was taken 2 minutes after adding the chlorine gas. The color of the polymer cement was water white, indicating that the living polystyryl lithium (S—B—S⁻Li⁺) was terminated. In addition, gel permeation chromatography was performed on samples taken before and after the addition of chlorine. The results of the gel permeation chromatography show the absence of large amounts of high molecular-weight polymer (HMP). A non-terminated polymer usually couples or crosslinks to form HMP. The amount of HMP observed in the chlorine-terminated polymer was relatively small and typical of methanol terminated polymer.

EXAMPLE 4

S—B—S Polymer Terminated With Cyclopentadiene

A styrene-butadiene-styrene (S—B—S⁻Li⁺) block copolymer of 63,000 molecular weight was made by anionic polymerization using sec-butyl lithium as the initiator. The polymerization was performed in a mixture of cyclohexane and diethyl ether in a two-gallon autoclave. The resulting polymer solution contained 20 percent polymer by weight.

A cold solution of cyclopentadiene in cyclohexane (to minimize dimerization) was added to the reactor. The amount of cyclopentadiene added to the reactor provided 50 percent excess terminating agent on a molar basis. The expected reaction is shown in Equation 10:

$$S-B-S^-Li^+ + C_5H_6 \rightarrow S-B-S-H + LiC_5H_5 \quad (10)$$

The reactor temperature was held constant at 30° C. and the pressure held constant at approximately 60 psig.

A sample of the contents of the reactor was taken 1 minute after adding the cyclopentadiene solution. The color of the polymer cement was water white, indicating that the living polystyryl lithium (S—B—S⁻Li⁺) was terminated. In addition, gel permeation chromatography was performed on samples taken before and after the addition of the cyclopentadiene solution. The results of the gel permeation chromatography show that approximately 50 percent of the target polymer was coupled to form a 126,000 molecular-weight species. No HMP was formed.

We claim:

1. In a process for anionically polymerizing monomers with an anionic polymerization initiator in a suitable solvent thereby creating a living polymer, the improvement which comprises terminating the polymerization by the addition of a terminating agent selected from the group consisting of, ammonia, and silanes.

2. The process of claim 1 wherein the anionic polymerization initiator is an organo alkali metal compound.

3. The process of claim 2 wherein the organo alkali metal compound is an organo lithium compound.

4. The process of claim 3 wherein the organo lithium compound is sec-butyllithium.

5. The process of claim 1 wherein the monomer to be polymerized is selected from the group consisting of acrylamides, acrylonitriles, nitrobutenes, vinyl isocyanates, anhydrides, acrylates, methacrylates, vinyl pyridines, carbodiimides, lactams, dienes, styrene, alkylstyrenes, halogenated methoxy styrenes, nitrostyrene and 1,3-octadiene.

6. The process of claim 5 wherein the anionic polymerization initiator is an organo alkali metal compound.

7. The process of claim 6 wherein the organo alkali metal compound is an organo lithium compound.

8. The process of claim 7 wherein the organo lithium compound is sec-butyllithium.

9. The process of claim 1 wherein the monomer to be polymerized is a conjugated diolefin.

10. The process of claim 9 wherein the anionic polymerization initiator is an organo alkali metal compound.

11. The process of claim 10 wherein the organo alkali metal compound is an organo lithium compound.

12. The process of claim 11 wherein the organo lithium compound is sec-butyllithium.

13. The process of claim 9 wherein the conjugated diolefin is selected from the group consisting of butadiene and isoprene.

14. The process of claim 1 wherein the monomers to be polymerized are conjugated diolefins and alkenyl aromatic hydrocarbons.

15. The process of claim 14 wherein the anionic polymerization initiator is an organo alkali metal compound.

16. The process of claim 15 wherein the organo alkali metal compound is an organo lithium compound.

17. The process of claim 16 wherein the organo lithium compound is sec-butyllithium.

18. The process of claim 14 wherein the conjugated diolefins are selected from the group consisting of butadiene and isoprene and the alkenyl aromatic hydrocarbons are selected from the group consisting of styrene, alkyl-substituted styrenes, vinyl naphthalene and alkyl-substituted vinyl naphthalenes.

19. In a process for anionically polymerizing monomers with an anionic polymerization initiator in a suitable solvent thereby creating a living polymer, the improvement which comprises terminating the polymerization by the addition of a borane terminating agent.

20. The process of claim 19 wherein the monomers to be polymerized are conjugated diolefins and alkenyl aromatic hydrocarbons.

* * * * *